(12) United States Patent
Raymond

(10) Patent No.: US 8,040,638 B2
(45) Date of Patent: Oct. 18, 2011

(54) SELF-FIXTURING PIVOTING ACTUATOR

(75) Inventor: Peter J. Raymond, Erie, CO (US)

(73) Assignee: ESGW Holdings Limited, Tortola (VG)

( * ) Notice: Subject to any disclaimer, the term of this patent is extended or adjusted under 35 U.S.C. 154(b) by 573 days.

(21) Appl. No.: 11/494,212

(22) Filed: Jul. 27, 2006

(65) Prior Publication Data

US 2008/0024926 A1    Jan. 31, 2008

(51) Int. Cl.
    *G11B 5/55*      (2006.01)
    *G11B 21/08*      (2006.01)

(52) U.S. Cl. .................... 360/266; 360/266.1

(58) Field of Classification Search .......... 360/266, 360/244.8, 265.7–266.1; 29/603.03
See application file for complete search history.

(56) References Cited

U.S. PATENT DOCUMENTS

| | | | |
|---|---|---|---|
| 4,875,117 A * | 10/1989 | Slezak et al. | 360/98.01 |
| 5,404,636 A | 4/1995 | Stefansky et al. | |
| 5,691,581 A * | 11/1997 | Umehara et al. | 310/13 |
| 5,828,521 A * | 10/1998 | Hasegawa | 360/266.1 |
| 5,862,019 A * | 1/1999 | Larson | 360/265.8 |
| 6,002,551 A | 12/1999 | Goss et al. | |
| 6,091,578 A | 7/2000 | Stole et al. | |
| 6,215,624 B1 * | 4/2001 | Summers et al. | 360/244.5 |
| 6,236,544 B1 * | 5/2001 | Hirokawa et al. | 360/266.1 |
| 6,442,001 B1 * | 8/2002 | Coon et al. | 360/266.1 |
| 6,487,053 B1 * | 11/2002 | Matsumura et al. | 360/265.7 |
| 6,751,064 B2 * | 6/2004 | Kuwajima et al. | 360/244.8 |
| 6,781,796 B2 * | 8/2004 | Macpherson et al. | 360/265.7 |
| 6,941,641 B2 * | 9/2005 | Van Sloun | 29/603.03 |
| 6,950,285 B2 * | 9/2005 | Wada et al. | 360/265.7 |
| 7,031,117 B2 * | 4/2006 | Nguyen et al. | 360/265.9 |
| 7,312,954 B1 * | 12/2007 | Leabch et al. | 360/265.2 |
| 2004/0181933 A1 * | 9/2004 | Detjens et al. | 29/603.03 |
| 2005/0213256 A1 * | 9/2005 | Dexter et al. | 360/265.6 |

* cited by examiner

*Primary Examiner* — Daniell L Negron
*Assistant Examiner* — Adam B Dravininkas
(74) *Attorney, Agent, or Firm* — Saile Ackerman LLC; Stephen B. Ackerman

(57) ABSTRACT

A rotary actuator arm assembly for positioning a transducer over a data track of at least one rotating magnetic disk. The actuator includes self contained spacers with semi-kinematic mounting features to accurately locate and secure a set of self-aligning components, thereby eliminating azimuth alignment problems created by conventional assembly procedures.

18 Claims, 7 Drawing Sheets

SELF-FIXTURING PIVOTING ACTUATOR

BACKGROUND OF THE INVENTION (1) Technical Field

This invention relates to a pivoting actuator used in a head stack assembly (HSA) for a magnetic disk drive, and more particularly, is concerned with improvements in manufacturing and assembly of actuator parts (2) Description of the Prior Art The following four documents relate to methods dealing with improvements to a head stack assembly.

U.S. Pat. No. 5,862,019 issued Jan. 19, 1999 to Larson discloses a disk drive actuator assembly adapted for assembly in one of several configurations from a single line of modular components without a manually supervised aligning step.

U.S. Pat. No. 6,091,578 issued Jul. 18, 2000 to Stole. et al. describes disk drive actuator components made of composite material including two layers of fibers orientated in a perpendicular direction relative to each other.

U.S. Pat. No. 6,002,551 issued Dec. 14, 1999 to Goss, et al, discloses a suspension attachment technique and apparatus for attaching suspension to an actuator arm in a disk drive.

U.S. Pat. No. 5,404,636 issued Apr. 11, 1995 to Stefansky, et al, describes a method for assembling a disk drive actuator by inserting a comb device to obtain proper parallelism between stacked drives.

For the past several years, data storage methods has followed a tendency of escalating storage capacity while also shrinking the physical size occupied by its storage capacities. Introduction of ever more powerful computer hardware and software has contributed to increasing market pressures for less expensive, larger capacity and smaller packaging in disk drives. Storage device manufacturers make every effort to achieve any possible incremental cost savings that can be reasonably achieved without loss of technical performance.

The parts and assembly costs for a head stack assembly (HSA) in a magnetic disk drive represent a significant portion of the total cost of the drive apparatus. FIG. 1 illustrates main components of a magnetic disk drive apparatus as conventionally used in present day disk drives. Reference numeral 10 denotes a plurality of magnetic hard disks rotating around an axis 11, and 12 shows an assembly carriage device for positioning each magnetic head slider on a track of each disk. The assembly carriage device 12 is mainly constituted by a pivoting actuator assembly 14 capable of rotating around an axis 13 and a main actuator coil 15 such as for example a voice coil motor for driving the pivoting actuator assembly 14 to rotate. The HSA includes a carriage 14 that is made by machining a suitable material, or by molding or extrusion. Carriage 14 includes one or more suspensions arms represented by the top most suspension arm 16.

Support sections at one ends of a plurality of suspensions 16 are stacked along the axis 13 are attached to the carriage 14, and one or two head gimbal assemblies 17 are mounted on a top section at the other end of each suspension arm 16. Each of the gimbal assemblies 17 has the magnetic head slider mounted at its distal end that the slider opposes to one surface (read and write surface) of each of the magnetic disks 10.

The present invention allows an actuator to be made with fewer parts while reducing the total manufacturing cost by simplifying the assembly operation. Moreover, the present invention reduces tolerances in the actuator assembly while improving drive reliability and robustness.

In present hard disk drive designs, typically a head slider, is positioned by a head stack assembly (HSA) over and under magnetic disks to perform reading and writing of information to the disks. The constituent elements of a standard HSA's include a ball bearing pivot assembly and arms extending across the surfaces of one or more pieces of rotating magnetic media. Typically a head gimbal assembly is positioned at a distal end of each arm. Mounted to the head gimbal is a head slider with a read/write orientation with respect to an associated disk.

In present designs, parts are aligned to each other using external tooling and secured in place with threaded fasteners. Using external tooling to align parts necessitates precision grade tolerances with controlled aligning references. Moreover, the threaded fasteners add increased parts and cost to the actuator assembly, while creating excessively constrained conditions that induce distortions and misalignment of significant parts within the assembly.

SUMMARY OF THE INVENTION

It is an object of the invention to provide an improved method for the manufacture of a head stack assembly.

It is another object of the invention is to provide a head stack assembly with fewer and less expensive parts while reducing overall manufacturing cost and increasing performance.

It is still another object of the invention to simplify the overall assembly operation of the head stack assembly.

It is still another object of the invention to reduce manufacturing tolerances yet improving drive reliability and robustness.

It is yet another object of the invention is to provide a head stack assembly that does not add mass to the disk drive system thereby achieving reduction in the access time of the magnetic heads to selected data tracks of the rotating disks.

It is still another object of the invention not to introduce foreign material into the disk drive. It will not outgas, corrode, wear, or fall off the suspension.

The foregoing objects of the invention are accomplished and the disadvantages of the prior art overcome by the provision of a disk self-fixturing pivoting actuator, or as it is also known as a head stack assembly.

A novel application of geometrics, kinematics and semi-kinematic design principles are at the center of the present invention. Applying these principles while integrating parts serve the assembly and improves reliability of the pivoting actuator. The design principles provide the full natural tolerance and constraint balance for the assembly of parts. Parts they produce are easier to make, also, function much better as an assembly with zero-stress location.

For little or no additional cost, the sheet metal arm and spacers in an actuator assembly can have features added so that the alignment to each other is controlled by the parts themselves and not by using external tooling.

The foregoing, together with other objects features and advantages of this invention, can be better appreciated with reference to the following specification, claims, and the accompanying drawings.

DETAILED DESCRIPTION OF THE PREFERRED EMBODIMENT

Figure 1:
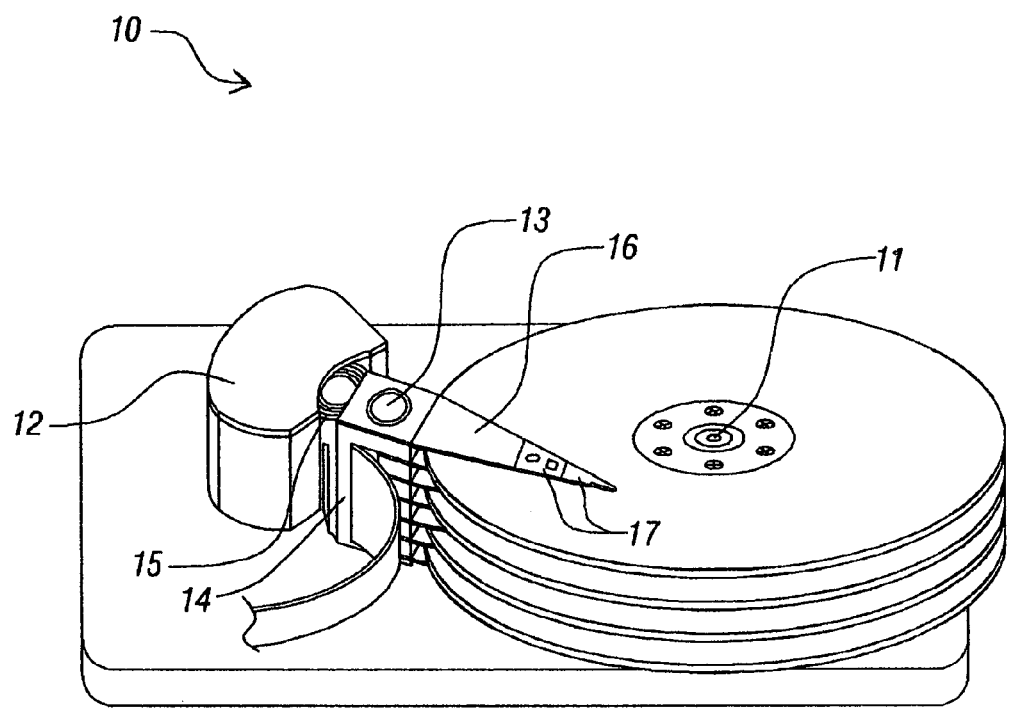
FIG. 1 is a perspective view of a typical head stack assembly from the prior art.
Figure 2:
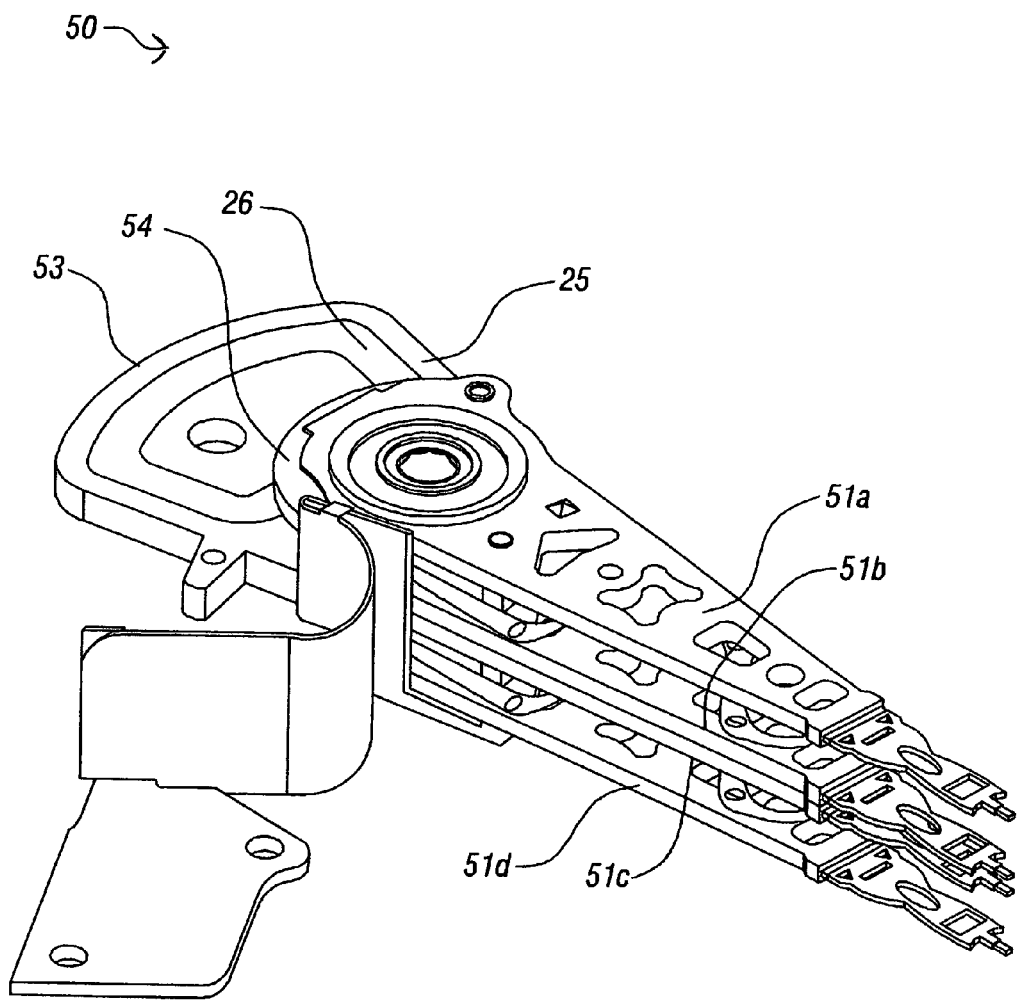
FIG. 2 shows an illustration of a head stack assembly according to the invention.
Figure 3A:
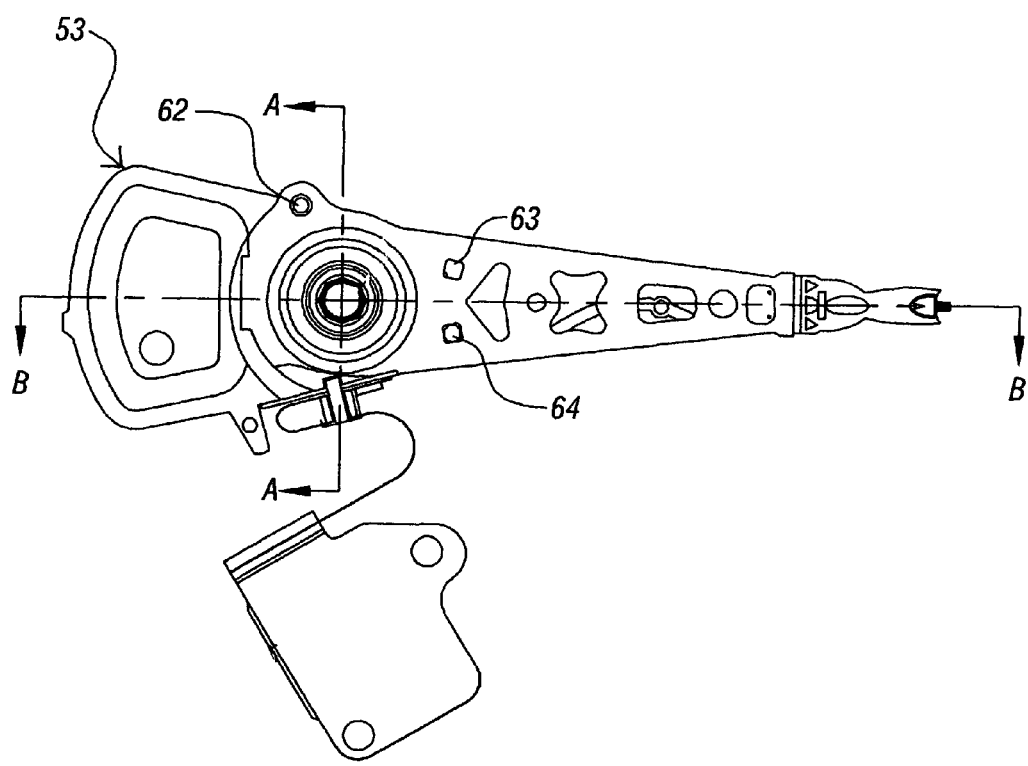
FIG. 3a shows a top view of the 2.5 inch head stack assembly according to the invention.
Figure 3B:
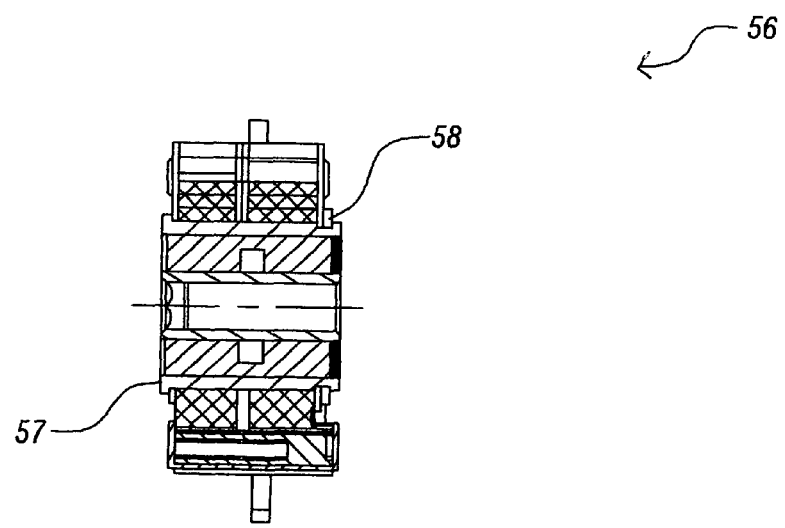
FIG. 3b shows a cross-section of the pivot bearing assembly, according to the invention.
Figure 3C:
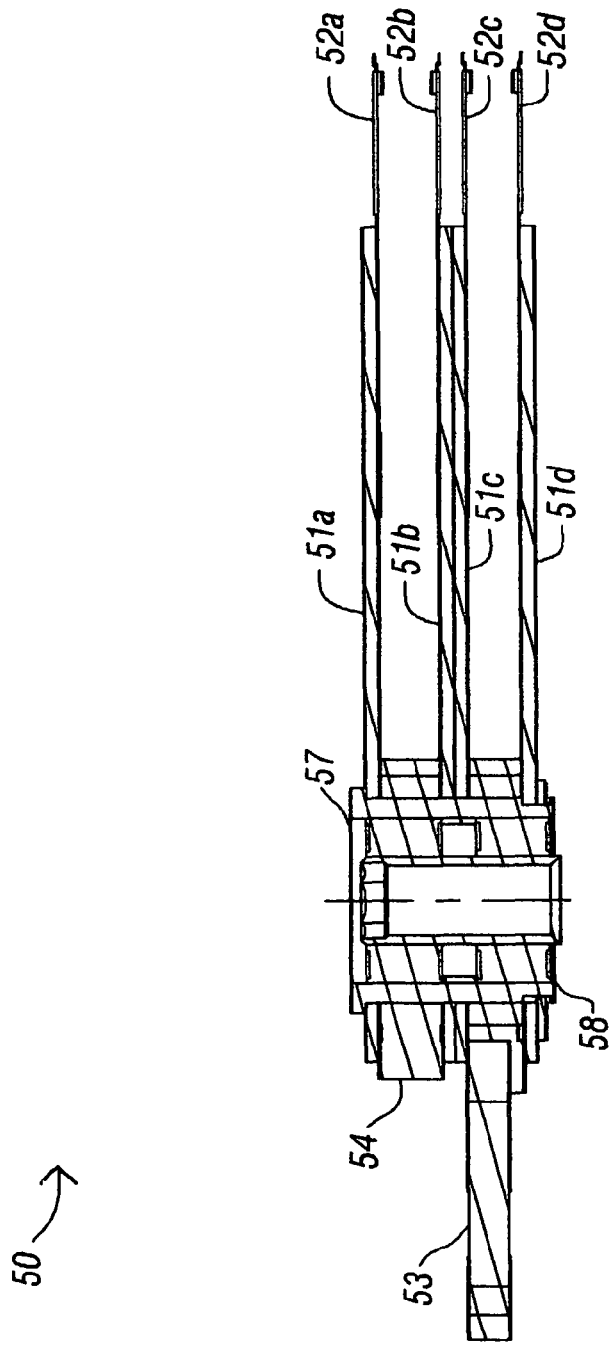
FIG. 3c shows a partial cross-sectional side view of a head stack assembly according to the invention.

Referring now to FIG. 2 and FIG. 3c showing an exemplary design of a 2.5 inch, or smaller, head stack assembly 50 manufactured in accordance with this invention. In the embodiment shown, the head stack assembly was designed for a disk drive with two disks. The embodiment further includes head assemblies 51a, 51b, 51c and 51d with each suspension 52a-52d distally carrying thin-film magnetic head elements 59 used to read and write information on both sides of these two disks. The details of the four head arm assemblies are best illustrated in FIGS. 3c and 6-8. Referring now to both FIGS. 2 and 3c, a stacked sequence of the above multiplicity of parts are as follows: Starting from the bottom of the head stack assembly 50, there is head arm assembly 51d, a primary spacer 53, two more head arm assemblies 51c and 51b, a secondary spacer 54 and the forth head arm assembly 51a. The lower primary spacer 53 also incorporates a coil, which, along with a magnetic structure mounted to the drive baseplate (not shown), is used to rotate the actuator and move the heads across the disk surfaces. The arms 51a-51d and spacers 53, 54 are slipped over a flanged bearing housing 57 containing cylindrical ball bearings making up the pivot assembly 56 shown in a cross-sectional view in FIG. 3b. A bowed snap ring 58 is placed within a receiving groove located opposite the flanged end of the flanged bearing housing 57. The above mentioned stacked sequence of parts are fixed firmly in place by the applied clamping force provided by the bowed snap ring 58. No other fasteners are needed for the actuator assembly.

As previously mentioned, the proper application of geometrics, kinematics and semi-kinematics design principles are at the center of the present invention. Applying these principles while integrating parts serve the assembly and improves reliability of the pivoting actuator. The design principles provide the full natural tolerance and constraint balance for the assembly of parts. Parts they produce are easier to make, also, function much better as an assembly with zero-stress location.

Figure 4:
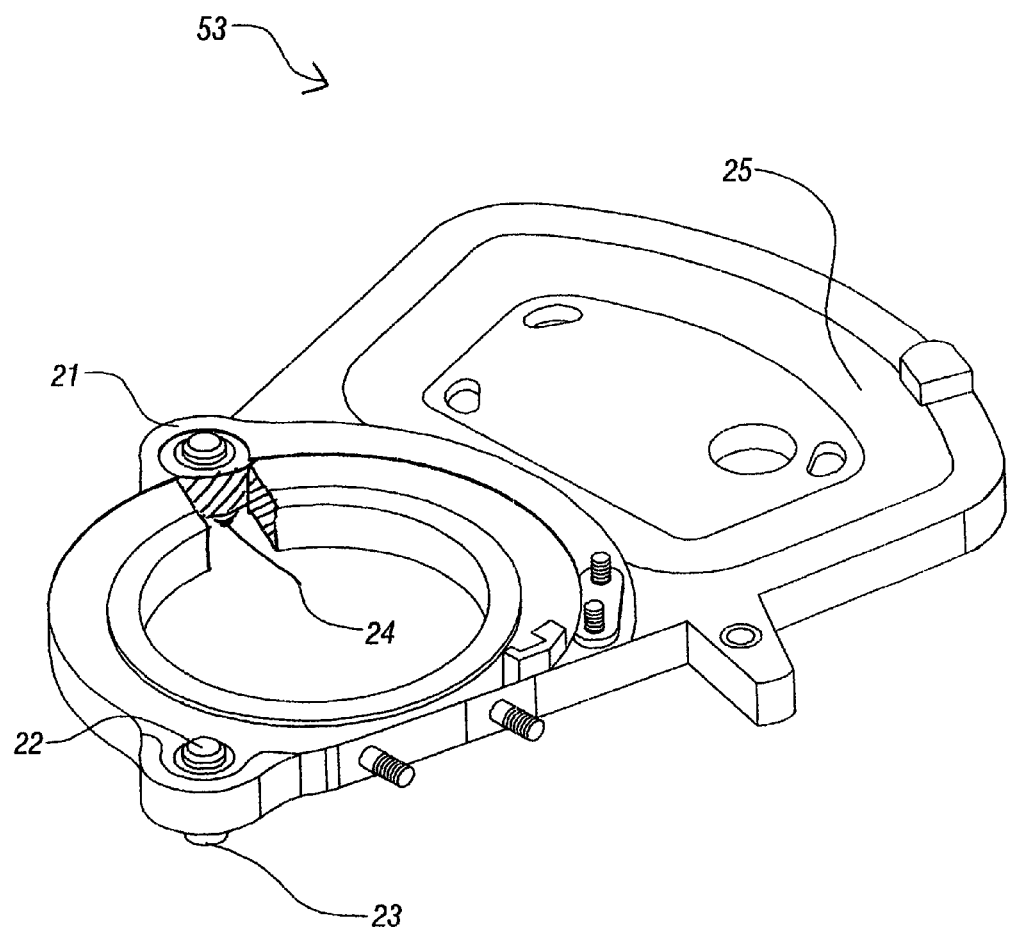
FIG. 4 illustrates a primary spacer used for locating and securing all other components of a head stack assembly according to the invention.
Figure 5:
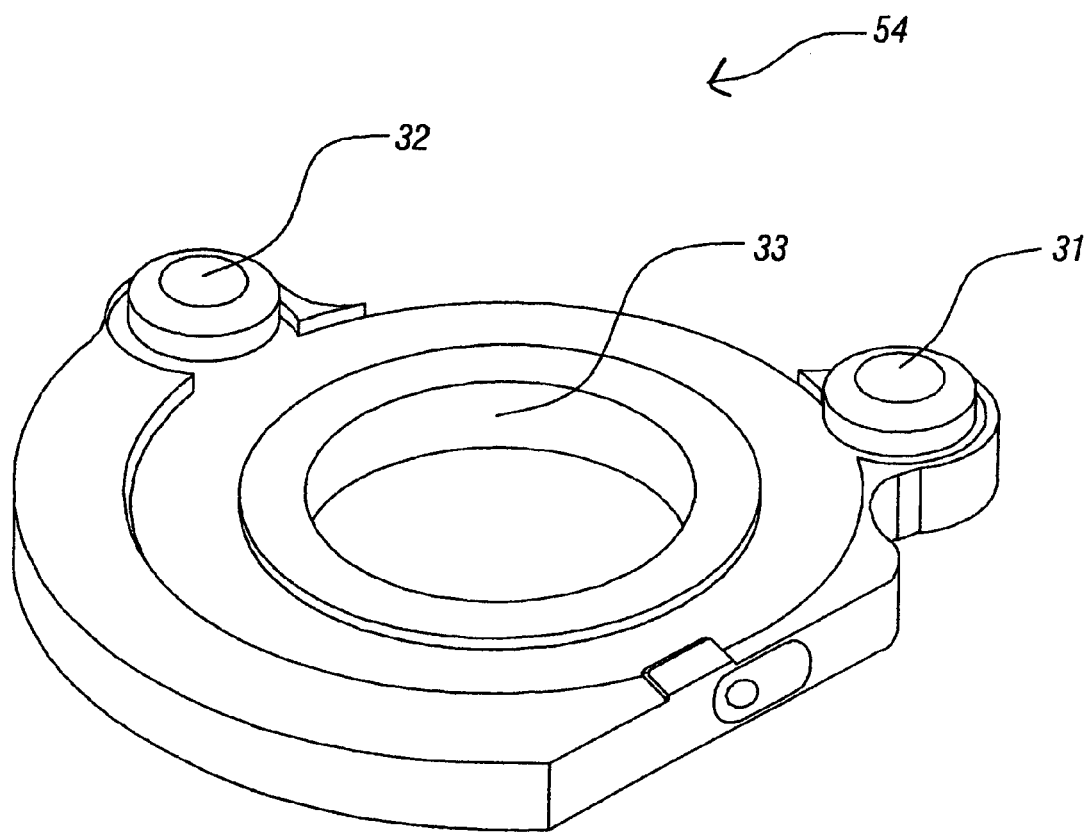
FIG. 5 shows a secondary spacer used for securing additional suspension arms according to the invention.

Referring now to FIG. 4 showing the primary spacer 53, and FIG. 5 showing the secondary spacer 54 are each designed with self-fixturing features. The most critical alignment in a disk drive actuator is accurate and stable azimuth alignment of the various arms and spacers. If the alignment is not accurate the various heads will not all reach the outer and inner radii of the disk surfaces at the same time. This reduces the size of the available recording area on the disks and thereby reduces the maximum amount of data that can be stored by the disk drive. Further, if this alignment is not stable, it is possible that the drive will not be able to read back previously written data, which makes it an unacceptable condition.

In a self-fixturing design, the azimuth alignment is created and maintained by features intrinsic to the suspension arms 51a, 51b, 51c and 51d and spacers 53, 54. FIGS. 4 thru 8 illustrate the self-fixturing properties. FIGS. 4 and 5 show designs of the spacers 53 and 54 with basic self-fixturing features. Preferably, both primary and secondary spacers 53 and 54 respectively, are molded of a rigid plastic which includes, on the primary spacer 53, an over-mold feature 26 for securing a motor coil element.

Applying geometric design and statistical process control, directs the design of the primary spacer 53 as a receiving element for which the other parts, namely, arm assemblies 51a-51d, spacer 54, and flanged bearing housing 57 cooperate. FIG. 4 shows the design of the primary spacer 53 as the central building block for the entire head stack assembly 50 in accordance with this invention. Locating pins 21, 22, 23 and 24 are essential elements in the actuator assembly. Pins 21 and 24, shown in a partial cut-away, are positioned coaxially, one over the other, as are pins 22 and 23, as illustrated in FIG. 4.

Figure 5A:
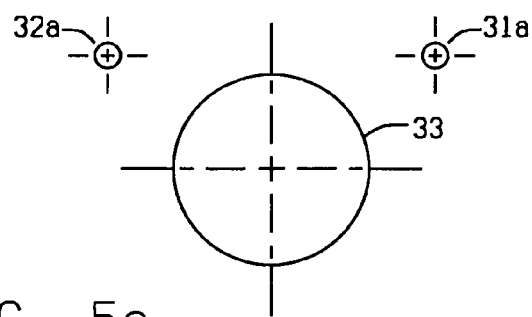
FIG. 5a is a bottom layout view of two coaxially aligned holes disposed on the bottom surface of the secondary apacer shown in FIG. 5

In FIG. 5, the secondary spacer 54 also receives head arm assemblies. As described earlier, and illustrated in FIGS. 2 and 3c, the head stack assembly is designed for a disk drive with two disks. Four head arm assemblies 51a-51d with attached suspensions 52a-52d with attached thin-film magnetic head elements 59 used to read and write magnetic information on both sides of these two disks. The perspective view of the head stack assembly in FIG. 2 best shows the overall design package. The assembly configuration of the four head arm assemblies and associated spacers and cartridge bearing is best illustrated in FIGS. 3c, 4 and 5. An exemplary sequence starts from the bottom of the head stack assembly 50. Firstly, head arm assembly 51d is inverted and urged onto shorter molded pins 23, 24 disposed under the primary spacer 53, shown in FIG. 4. The shorter pins are coaxially in line with the upper pins 21, 22. Secondly, arm 51c is urged, right side up, onto the longer molded pins 21, 22 disposed on the topside of primary spacer 53. Thirdly, arm 51b is inverted and urged onto the longer molded pins 21, 22 on top of arm 51c previously assembled onto primary spacer 53. Right side-side up implies an orientation such that the slider containing the magnetic head element is on the lower face of the head arm assembly. Secondary spacer 54, refer to FIG. 5, is urged onto the upper pins 21, 22 of primary spacer 53 over the previously assembled arms 51c and 51b, therein sandwiching the two arms between spacers 53, 54. The slotted hole 32a and squared hole 31a disposed at the underside of secondary spacer 54 as shown in FIG. 5a, are coaxially in line with molded pins 21, 22 of primary spacer 53 and the upper and shorter molded pins 31 and 32 of secondary spacer 54. The combination of slotted hole and square hole along with bearing bore 33, also shown in FIG. 5, provide freedom allowing the head suspension assembly to thermally expand, between holes 32a and 32b relative to the pivot bearing bore 33, permitting ease for assembly and disassembly of the head suspension assembly. The head suspension assembly 51a is placed right side up and urged onto pins 31 and 32.

In a self-fixturing design, the azimuth alignment is created and maintained by features provided on the suspension arms 51 and spacers 53, 54. Referring now to FIGS. 3a, 3c and 6-8 showing the design of the suspension arm 51. FIG. 3a illustrates a top view of the suspension arm having two square stamped alignment holes 63, and 64, and one stamped alignment slot 62 in each of the suspension arms. Only one of the square holes 63 is used in combination with the alignment slot 62. This allows a single production tool to be used for suspension arms designed for both right-side-up and inverted use. Each suspension arm 51a-51d is located in the X and Y directions by a molded pin on a spacer passing through the alignment hole in the suspension arms. The azimuth alignment of each arm relative to the spacers is controlled by a molded pin on a spacer going through the alignment slot in the suspension arm. In both of these two interfaces there is a small amount of interference between the pins and the corresponding features on the suspensions arms so that the positions of the arms are explicitly set and controlled.

Figure 6:
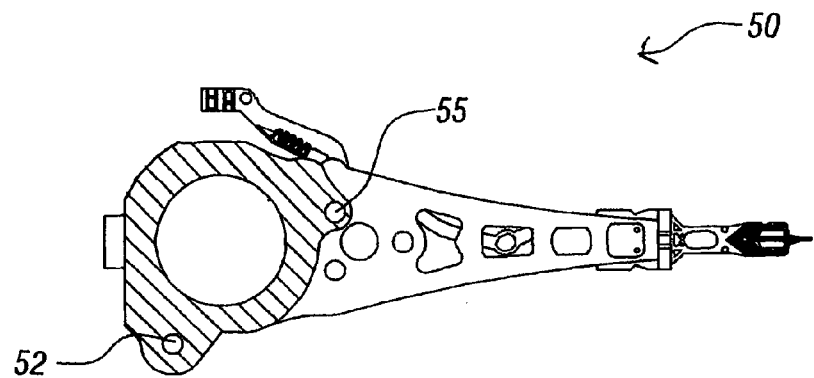
FIGS. 6, 7 and 8 show a top view, a side view, and bottom view, respectively, of a head arm assembly according to the invention
Figure 7:
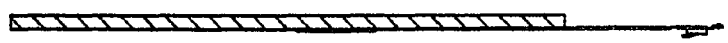
Figure 8:
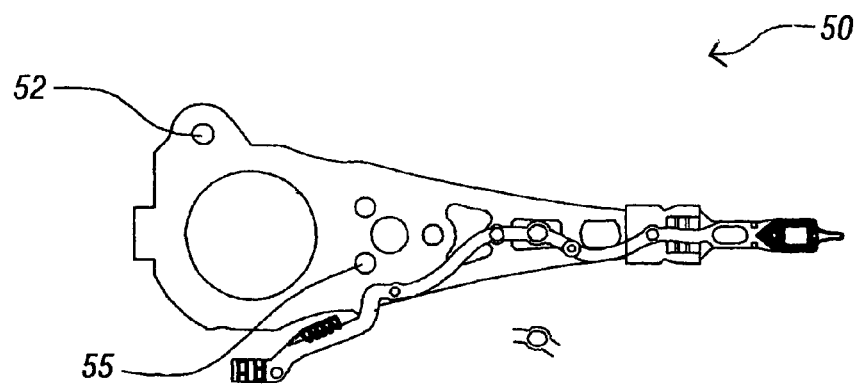

During the assembly of the suspension arms, an interference between the holes in suspensions 51 and the locating pins in the primary spacer 53 and secondary spacer 54 requires a force to urge the suspension arm over the pins. In the case of a slot sliding over a pin, the force is greatly reduced because there is only contact between the pins and slot at two linear areas on opposite sides of the pins. To reduce the force required to urge the holes over the pins, square holes are used in the suspension arms instead of round holes, thereby reducing the contact to only four linear areas of contact. In FIGS. 6, 7 and 8 showing a top view of a typical suspension according to the invention, a side view, and a bottom view respectively.

With this combination of geometries and kinematics and semi-kinematics design principles, all of the suspension arms and both spacers are accurately and securely aligned to each other and the alignment is not dependant on external tooling. Moreover, because of the interference at the interfaces, the azimuth alignment of the various parts is well controlled and will not shift over time.

In summary therefore, is a rotary actuator assembly for a 2.5 inch disk drive or smaller. The disk drive having a support base and a pivot bearing assembly. The rotary actuator assembly includes a primary spacer standard having a top surface separated from a bottom surface. The primary spacer standard receives at least one suspension arm assembly standard and one secondary spacer standard. The primary spacer is designed having a semi-kinematic arrangement for controlling azimuth alignment. The primary spacer standard includes a datum hole having a pivot axis, the datum hole receives the pivot bearing assembly. A plurality of locator pins are disposed on the top surface and are coaxially aligned with locator pins on the bottom surface. The locator pins receive suspension arm assemblies and a secondary spacer. Accommodation is made for an included coil assembly.

While the invention has been particularly shown and described with reference to the preferred embodiment, it will be understood by those skilled in the art that various changes in form and details may be made without departing from the spirit and scope of the inventions.

What is claimed is:

1. A rotary actuator assembly for a disk drive, the rotary actuator assembly including a primary spacer and a secondary spacer, each having a top surface separated from a bottom surface comprising:
a datum hole having a pivot axis, the datum hole for receiving a pivot bearing assembly;
the primary spacer having a plurality of locator pins disposed on the top surface coaxially aligned with locator pins on the bottom surface, the locator pins receive head suspension assemblies and the secondary spacer; and
a first head suspension assembly, also having a datum hole, is demountably inverted, head side up, and urged onto the underside of the primary spacer, the first head suspension assembly further comprising:
an ellipsoidal shaped hole and two polygonal shaped holes for engagement with the shorter locating pins disposed on the underside of the primary spacer, said holes shaped for controlling azimuthal alignment;
a second head suspension assembly, also having a datum hole, is demountably urged, head side down, onto upper locator pins of the primary spacer;
the first and second head suspension assemblies are interleaved between the primary spacer and the secondary spacer; and
a coil assembly area disposed on the top surface of the primary spacer using conventional means for attachment of the coil.

2. The rotary actuator assembly of claim 1 wherein the ellipsoidal shaped hole and two polygonal shaped holes provide unrestrained degrees of freedom with minimal surface contact with the locator pins of the primary and secondary spacers while providing a geometric mounting arrangement.

3. The rotary actuator assembly of claim 1 wherein the actuator assembly comprising the primary spacer, secondary spacer, and two head suspension assemblies are locked together by sliding a flanged cylindrical ball bearing housing through the stacked datum holes and secured in place with a bowed snap ring.

4. The rotary actuator assembly of claim 1 wherein azimuth alignment is achieved by using one ellipsoidal shaped hole and one polygonal shaped hole.

5. The rotary actuator assembly of claim 4 wherein the one ellipsoidal shaped hole and one polygonal shaped hole provide a geometric mounting arrangement that eliminates external tooling needed for alignment.

6. The rotary actuator assembly of claim 1 wherein the primary spacer is made from a thermoplastic.

7. The rotary actuator assembly of claim 1 wherein azimuth alignment is secured by using male and female location features with limited areas of contact and controlled amounts of interference, thereby reducing the assembly forces needed to properly locate the head suspension assemblies onto the pins of the primary spacer, hence securing and controlling the positions of the head suspension assemblies while eliminating clamping distortions.

8. A rotary actuator assembly for a 2½ inch form factor, the rotary actuator assembly including a primary spacer, a secondary spacer, and at least one head suspension assembly, the primary spacer comprising:
a top and bottom surface;
an upper set of locator pins disposed on the top surface are coaxially aligned with a lower set of locator pins on the bottom surface, a first head suspension is demountably urged, head side up, into the lower set of locator pins; and
the secondary spacer comprising;
a top and bottom surface,
locator pins on its top surface, and two coaxially aligned holes on its bottom surface, one hole is an ellipsoidal shaped hole and the other a polygonal shaped hole, the locator pins and coaxial holes are geometrically aligned and referenced to a datum hole included on the primary spacer;
the ellipsoidal shaped hole and the polygonal shaped hole on the bottom of the secondary spacer are urged into the locator pins of the primary spacer;
a second head suspension assembly placed, head side down, and demountably urged onto the upper set of locator pins of the primary spacer, and
a third head suspension assembly placed head side up and demountably urged onto a lower set of locator pins of the secondary spacer, and a fourth head suspension assembly placed head side down and demountably urged onto an upper set of locator pins of the secondary spacer;

a coil assembly area disposed on the top surface of the primary spacer using conventional means for attachment of said coil.

9. The rotary actuator assembly of claim 8 wherein the actuator assembly comprising the primary spacer with said datum hole, the secondary spacer and the four head suspension assemblies are slidably fit over a flanged cylindrical ball bearing housing and secured in place with a bowed snap ring, threaded nut, or other positive means of retention.

10. The rotary actuator assembly of claim 8 wherein a geometric mounting arrangement reduces external tooling needed for alignment.

11. The rotary actuator assembly of claim 8 wherein the primary and secondary spacers are made from a thermoplastic material and the head suspension assembly made from a metal.

12. A disk drive comprising:
a base;
a rotary actuator assembly comprising:
  a primary spacer; a secondary spacer; a plurality of head suspension assemblies;
  the primary spacer comprising:
    a geometric arrangement for controlling azimuth alignment, the primary spacer including:
    a top and bottom surface;
    a datum hole having a pivot axis, the datum hole for receiving a pivot bearing assembly, and a plurality of coaxially aligned locator pins disposed on the top surface and shorter locator pins disposed on the bottom surface, the top locator pins receives one of said plurality of head suspension assemblies and the secondary spacer, and a coil assembly area disposed on the top surface of the primary spacer using conventional means for attachment of said coil;
  the secondary spacer comprising:
    locator pins on its top surface for receiving each of said head suspension assemblies, and two coaxially aligned holes on its bottom surface, one hole is elongated, while the other is square shaped, the locator pins and coaxial holes are geometrically aligned and referenced to the bored datum hole included on the primary spacer, the elongated hole and the square shaped hole on the bottom of the secondary spacer are urged into the locator pins of the primary spacer;
  each of said plurality of head suspension assemblies comprising:
    a datum hole for receiving the pivot bearing assembly, and an ellipsoidal shaped hole and two polygonal shaped holes, for controlling azimuthal alignment while engaged with the shorter locator pins disposed on the underside of the primary spacer.

13. The disk drive of claim 12 and further comprising:
a first one of said plurality of head suspension assemblies is demountably inverted and urged onto the under side of the primary spacer.

14. The disk drive of claim 13 and further comprising:
a second one of said plurality of head suspension assemblies is placed, right side up, and demountably urged onto the topside of the primary spacer.

15. The rotary actuator assembly disk drive of claim 12 and further comprising:
a third one of said plurality of head suspension assemblies is invertedly placed and demountably urged onto the topside of the primary spacer and over the second head suspension assembly urged there under.

16. The rotary actuator assembly disk drive of claim 12 wherein the geometric mounting arrangement, supplied by the coaxial aligned locator pins on top of the primary spacer, includes the secondary spacer urgedly placed onto the top side of the primary spacer.

17. The rotary actuator assembly disk drive of claim 12 and further comprising:
a fourth one of said plurality of head suspension assemblies is placed right side up and demountably urged on the locator pins on the top surface of the secondary spacer.

18. The rotary actuator assembly disk drive of claim 12 wherein azimuth alignment is created by the use of the one elongated hole and the one square hole to limit the force needed to urge the head suspension assembly onto the pins of the primary and secondary spacers by reducing the interfering contact area between the members, hence securing and controlling the positions of the head suspension assembly while eliminating clamping distortions.

* * * * *